(12) United States Patent
Alexander et al.

(10) Patent No.: US 8,769,068 B2
(45) Date of Patent: Jul. 1, 2014

(54) SYSTEM AND METHOD FOR POLICY BASED MANAGEMENT FOR A HIGH SECURITY MANET

(75) Inventors: D. Scott Alexander, Warren, NJ (US);
Yuu-Heng Cheng, Piscataway, NJ (US);
Alexander Poylisher, Brooklyn, NY (US)

(73) Assignee: Telcordia Technologies, Inc., Piscataway, NJ (US)

( * ) Notice: Subject to any disclaimer, the term of this patent is extended or adjusted under 35 U.S.C. 154(b) by 533 days.

(21) Appl. No.: 12/711,638

(22) Filed: Feb. 24, 2010

(65) Prior Publication Data
US 2010/0217853 A1  Aug. 26, 2010

Related U.S. Application Data

(60) Provisional application No. 61/154,995, filed on Feb. 24, 2009.

(51) Int. Cl.
*G06F 15/16* (2006.01)
(52) U.S. Cl.
USPC .......................................................... 709/223
(58) Field of Classification Search
USPC .................................. 709/201, 202, 223, 224
See application file for complete search history.

(56) References Cited

U.S. PATENT DOCUMENTS

| | | | |
|---|---|---|---|
| 8,126,722 B2* | 2/2012 | Robb et al. | 705/1.1 |
| 2009/0228951 A1* | 9/2009 | Ramesh et al. | 726/1 |
| 2012/0124204 A1* | 5/2012 | Robb et al. | 709/224 |

OTHER PUBLICATIONS

Alexander et al., "The Dynamic Community of Interest and Its Realization in Zodiac", Oct. 2009, IEEE Communications Magazine, pp. 40-47.*
Cheng et al., "The Zodiac Policy Subsytem: a Policy-Based Management System for a High-Security MANET", Jul. 2009, IEEE international conference on Policies for distributed systems and networks, pp. 174-177.*
Alexander et al, "Requirements and Architectures for Intrinsically Assurable Mobile Ad Hoc Networks", Military Communications Conference, 2008, MILCOM2008, IEEE, 2008.*

* cited by examiner

*Primary Examiner* — Douglas Blair
(74) *Attorney, Agent, or Firm* — Philip J. Feig (57) ABSTRACT

A system and method for policy based management for a high security MANET comprises policy managers, each performing policy decision-making and policy enforcement using multiple policies, containers, each related to an application and each container having one policy manager, nodes, each having an infrastructure and at least one container, and dynamic community building blocks associating the containers having a same application, the containers being in different nodes, the associated containers maintained by the dynamic community building blocks on a secure network. Each container can define a security boundary around the node. Each container can be a lightweight virtual machine. The system can also have a special container having a policy manager only evaluating policies for conflicts. In one embodiment, a node can consist of multiple network devices and each network device is a container of its own.

34 Claims, 4 Drawing Sheets

SYSTEM AND METHOD FOR POLICY BASED MANAGEMENT FOR A HIGH SECURITY MANET

CROSS REFERENCE TO RELATED APPLICATIONS

The present invention claims the benefit of U.S. provisional patent application 61/154,995 filed Feb. 24, 2009, the entire contents and disclosure of which are incorporated herein by reference as if fully set forth herein.

FIELD OF THE INVENTION

The present invention relates generally to network management, network security, and in particular to policy-based network management for mobile ad-hoc networks (MANETs).

BACKGROUND OF THE INVENTION

With the development of increasingly complex systems, policies are widely used to allow users a level of customization and automation of a system without the need for rebuilding or restarting. Existing policy-based management systems (PBNM or PBMS) define customization for access control, obligated behavior, and/or flow control, but do not address architecture security. Most existing policy systems have a centralized approach to security and are defined with centralized policy control, where security is provided by the network authentication process, though some may utilize authentication information as part of the policy condition. Typically, both connectivity and trust are assumed, allowing the deployment of a centralized or hierarchical system for both distribution and evaluation of policies. Generally, one trusted node is assumed to exist in the PBNM. However, any node in the network may be an undetected attacker.

In the established Policy Decision Point (PDP) to Policy Enforcement Point (PEP) model, e.g., IETF's COPS-PR and NetConf for obligation policies, such as Smart Firewalls for authorization policies, policy decisions are made at a logically central point and then each decision is dispatched to the endpoints. Existing systems attempt to secure the PDP-to-PEP communication with transport-level security and user-level authentication (e.g., ssh for NetConf). The hierarchical paradigm has been adapted for use in MANETs, by providing dynamic service discovery and redundancy.

In an alternative approach, policies are created and processed centrally on the node rather than being isolated by application.

Any dispatching of policy decisions over the network increases chances of decision hijacking or interference and allows hostile network traffic observers to perform traffic analysis and deduce system behavior. Since the policy decision is made by one node, an attacker can target one node to compromise the whole network. Additionally, making policy decisions for an entire node from a single PDP increases the ability of an attacker who compromised a single application to compromise an entire node. Both policy distribution and policy enforcement are protected, at best, only by transport-level security, and authenticated only at the user level. The protection is insufficient in a hostile environment and authentication is too coarse-grain for a secure network with application-specific policies.

Typically, most policy languages support any combination of conditions. A potential security concern is implicitly allowing unexpected conditions when using the negate operation in the condition.

To illustrate this concern, the following is a sample policy condition. In a system with only "blue" and "purple" tracks, this policy condition allows only "blue" tracks to join the group A, B, or C. However, when a new track, say "red", is introduced to the system, the policy implicitly permits both the "red" and "blue" tracks to join the group, which is potentially undesirable.

---

...
Conditions : (request == "join" ) &&
    ( group == "A" || group == "B" || group == "C" ) &&
    ( track != "purple" ) –> "true" ;
...

---

Accordingly, to provide a high-security MANET, several new challenges are identified for the design of its PBMS.

First, strict enforcement of communication restrictions necessitates a highly decentralized network management, even within a node, with a PBMS instance for each container, shared resources and secure infrastructure. This in turn creates more pressure on the resource consumption of a given instance, as node resources are typically scarce.

Second, high security requires explicit protection of policy integrity in transit, authentication of policy creators and authorization before a policy is enforced.

Third, policies must be made available to the PBMS instances in a timely manner to ensure enforcement. Given the dynamic nature of community building block creation and the intermittent connectivity in MANETs, this requires appropriate policy distribution mechanisms.

Fourth, the general policy deconfliction problem is complicated by the fully decentralized nature of policy creation and enforcement, and by the need to deconflict policies for a particular communication domain against shared resource and node policies within each node.

Thus, there exists a need for a PBNM system that is resilient to insider and external attacks. An inventive solution to this need includes identification of the security, performance and usability requirements of PBMS for high-security MANETs, and architectural and design solutions to meet these requirements.

SUMMARY OF THE INVENTION

An inventive system and method with mobile ad hoc networking with a particular emphasis on security is presented. The inventive system is one in which policy is not part of the trusted computing base. The approach directly supports information integrity, availability, reliability, confidentiality, and safety as a matter of design. The network enforces authentication and authorization of all actions, deny by default for all actions, resistance to Byzantine faults and insider threats, and support a selected set of functionality implemented in trusted hardware. The inventive system and method enables isolation of policy decision and enforcement to nodes and to security containers within nodes. Policies cannot affect actions in other containers. All policies received are fully authenticated. Policy defaults to deny, so all policy statements add privileges.

The inventive system, in an exemplary embodiment, comprises one or more policy managers, each policy manager performing policy decision-making and policy enforcement; one or more containers, each container related to an application and each container having one policy manager of the one or more policy managers; one or more nodes, each node having an infrastructure and at least one container of the one or more containers; and dynamic community building blocks associating the one or more containers having a same application, the containers being in different nodes, the associated containers maintained by the dynamic community building blocks on a secure network. In one embodiment, each container defines a security boundary around a communication domain on the node. In one embodiment, each container is a lightweight virtual machine. In one embodiment, the system also comprises a special container having a policy manager only evaluating policies for conflicts. In one embodiment, a node can consist of multiple network devices and each network device is a container of its own.

The inventive method, in an exemplary embodiment, comprises performing, on one or more containers, policy decision-making and policy enforcement using a policy manager in each of the one or more containers; associating the one or more containers having a same application; and maintaining the associated containers on a secure network.

A computer readable storage medium storing a program of instructions executable by a machine to perform one or more methods described herein also may be provided.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION

Figure 1:
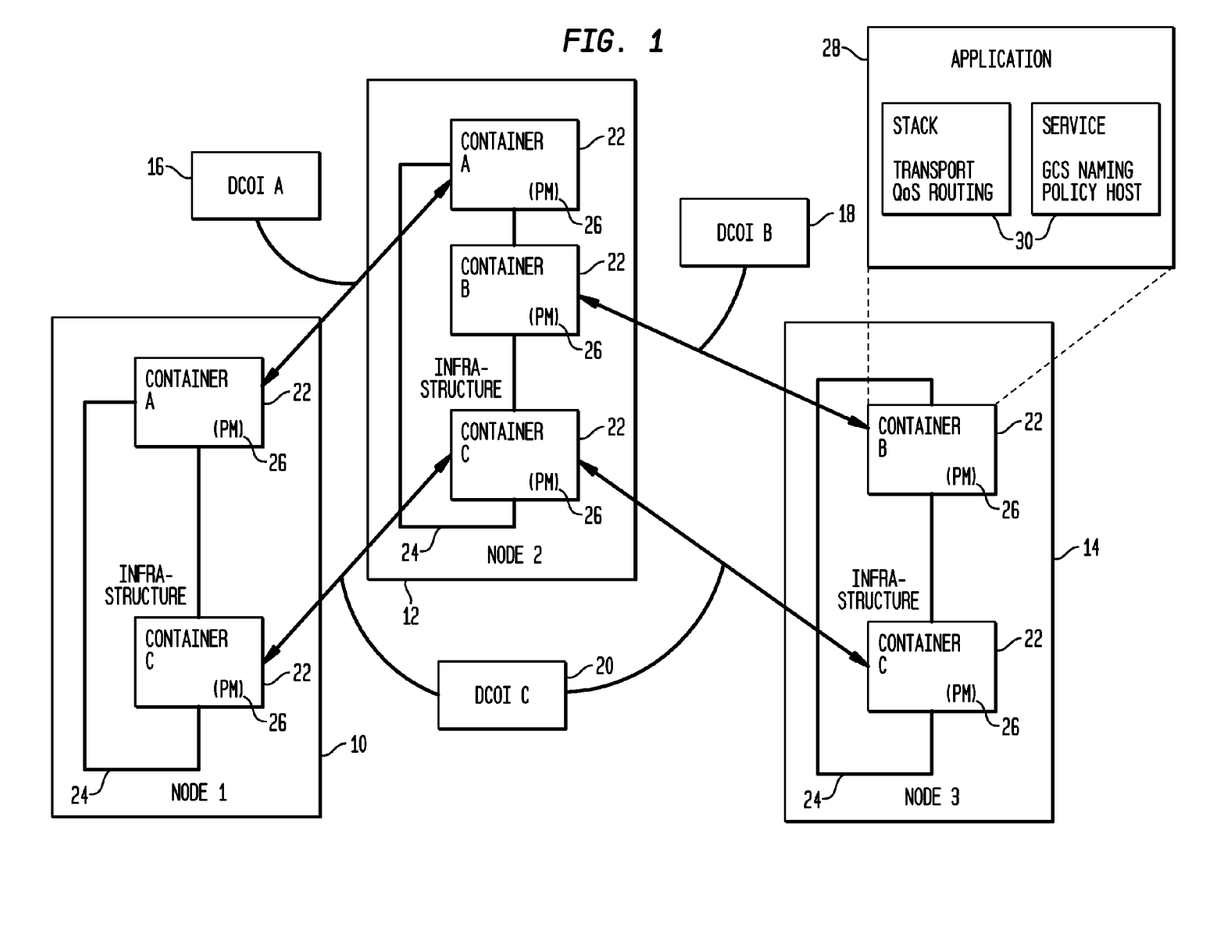
FIG. 1 is a schematic diagram of the present invention.

The invention comprises a method and a system for a PBMS which addresses high security. Communications domains are assumed to be isolated within the node using security containers, called herein DCoI (Dynamic Community of Interest). A node can be a network device or a collection of network devices. Since one node may be running multiple applications and/or services, the node may have multiple containers. DCoI is illustrated in FIG. 1, where nodes 1 10 and 2 12 belong to DCoI A 16, nodes 2 12 and 3 14 to DCoI B 18, and nodes 1 10, 2 12 and 3 14 belong to DCoI C 20. A network device with multiple containers 22 consists of a base infrastructure 24 (or DOMO for virtual machine) and several containers 22. The communication among the containers 22 over the network is restricted to only the DCoI 16, 18, 20 that the container belongs to.

A container 22 defines a security boundary around the node 10, 12, 14 and includes resources for a single DCoI 16, 18, 20. In one embodiment, it is implemented as a lightweight virtual machine. A container 22 is the security boundary of which application and its supporting service can manipulate resources restrained by the operating system or virtual machine. A policy manager (PM) 26 resides in each container 22 of the network device as shown in FIG. 1.

Infrastructure 24 is the lower-level or device-level resource controller for the actual CPUs, memory and lower layers of the network stack (MAC and below) of the node 10, 12, 14 and containers 22.

The behavior of the network nodes 30 must be automatically customizable at run-time as manual reconfiguration is impractical in the target operating conditions. While there are certain "rules" that must be statically built into the stack and services 30, e.g., all traffic must be encrypted, other aspects, e.g., the list of potential DCoI members, are specific to the way that the system is deployed and the way a particular DCoI is being used. In one embodiment, the customization can be policy-managed and can allow the rules of behavior to be expressed and analyzed outside of the managed components. A unique set of requirements exist for the PM to satisfy supporting high security in a MANET environment. They include low bandwidth use (potentially low CPU and memory), support of the dynamic nature of DCoIs, minimal dependence of a node on another node for policy enforcement, operations are denied by default, policy integrity must be ensured in storage and distribution, policy author and recipient must be authenticated, the operation of the policy-based management system must not breach exfiltration constraints, and access to resources used both by containers and within a container must be policy-managed.

Both computational (CPU, memory) and communication resources in a MANET environment can be very limited. Thus, a PM's processing footprint must be small, and policies themselves must be encodable in concise faun. The PM user interface needs to allow administrators to create and update policies under the stress of tactical environments. This, apart from UI design, necessitates high usability of the policy language. In order to address Byzantine attacks, it is highly undesirable to allow a management system on a compromised node to execute operations on a remote node. Each node must have the authority and responsibility to enforce policy to protect itself and the network.

In a permit-all, explicit-deny authorization scheme, one can only deny the known operations, and the set of permitted operations is unknown, which opens attack possibilities. Conversely, in a deny-all, explicit-permit scheme, one can permit the exact minimal set of operations necessary. Additionally, unanticipated actions are denied, thus avoiding the issue that unanalyzed actions may result in security holes in the system. This is the basic rationale for a deny-all scheme in a secure environment. Individual policies must not be corrupted and must be up-to-date. The set of policies enforced in all containers of the same communication domain must be identical and self-consistent.

In policy distribution, it is important to authenticate the author because only an explicit set of users are trusted to create policies. In order to reduce the potential of an attacker to infer mission details from policies, policies should be distributed only to authorized nodes. The authentication of the policy distribution can be achieved by using existing secure transportation protocols such as secure FTP, ssh, etc.

Another requirement is to minimize the opportunity for exfiltration between communication domains, so policy distribution should only occur within the affected communication domain.

The inventive system is a fully decentralized policy system. Each PM instance evaluates its own set of policies and makes decisions to control the managed components within a container. The only communication over the network is the policy contents. An alternative solution is to dispatch policy decisions from one or several locations over the network. In general, a fully decentralized solution is preferred because of the following advantages. Policy contents do not change nearly as frequently as policy decision results, low network latency is far less critical for policy contents as it is for policy decisions, and it is easier to support need-to-know policy evaluation and Byzantine fault tolerance. Policy content is, of course, sensitive on its own. Knowing the access control policies, for example, may reveal the usage of a communication domain. Because of this sensitivity, not only are policies in transit protected, but also, to ensure that even if the protections fail, the set of policies to which an attacker has access is minimized.

Figure 2:
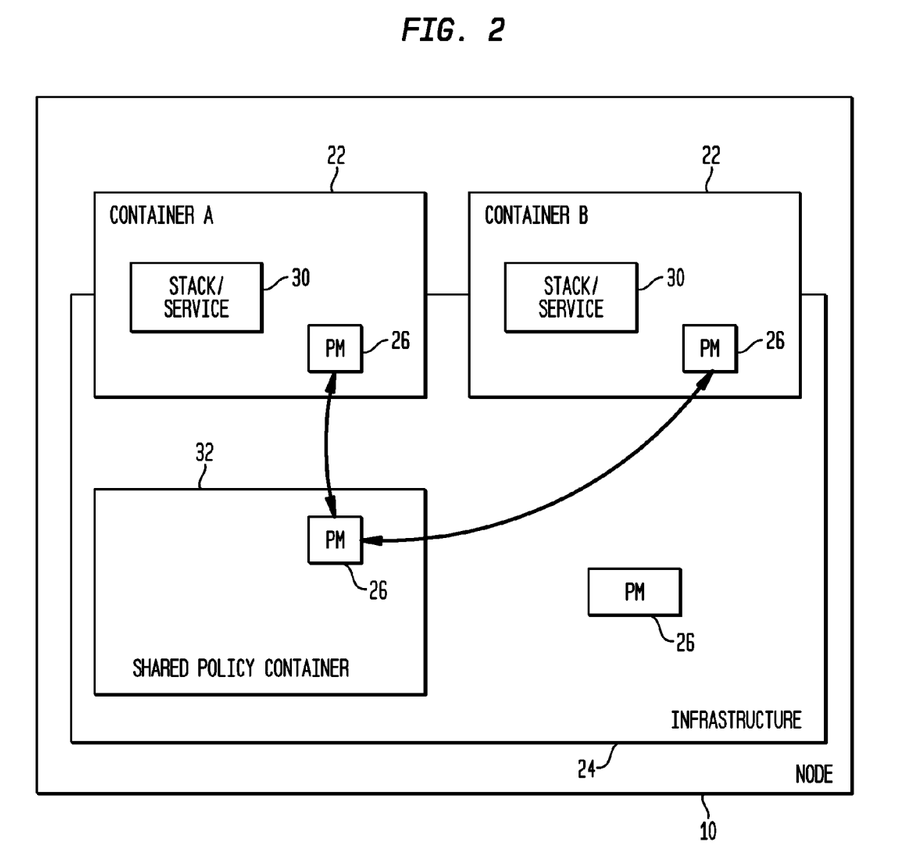
FIG. 2 shows components within a node in the present invention.

As described above, each PM is instantiated inside of a container. PM 26 is duplicated in each container 22 as shown in FIG. 2. This design reduces both the ability of an attacker to inspect policies from other containers and to affect the behavior of other containers if she manages to gain control of a container.

PM 26 supports both authorization and obligation policies. Because of the default deny-all authorization requirement, only positive authorization is supported. The behavior of the PM is identical within each container, however, the policies the PM evaluates belong to different scopes. The three different scopes are: container 22, shared-resource 32, and node 10. Details of each scope are described below. These scopes are predetermined and orthogonal to the authorization/obligation categorization.

The inventive system defines a specific container, Shared Policy Container 32, which runs a PM 26 that evaluates policies of the scope "shared resource." The PM in the shared policy container receives shared-resource policies from PM in other containers. This special PM only evaluates policies for conflict and does not enforce any policies. All of the enforcement is performed within each container. The PM receives its policies from the PMs in other containers. If there are conflicts, the corresponding PMs will be notified of a conflict. Note that the PM in the shared policy container can reside in the infrastructure as an optimization. However, it may increase the risk of a compromised network device. The communication between PMs are constrained to occur along the paths created and enforced by Infrastructure 24 to ensure no other operations are allowed.

Figure 3:
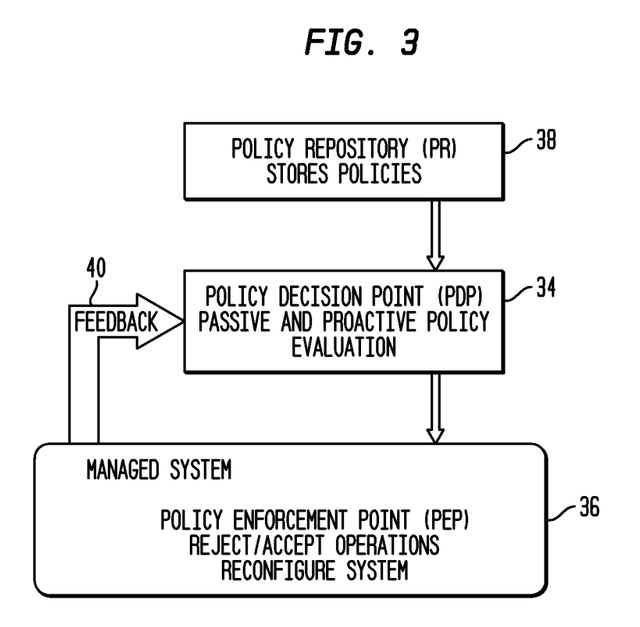
FIG. 3 shows a general purpose policy-based management system with feedback.

The PM can be based on the IETF policy-based management architecture [RFC 2753] with a feedback loop as shown in FIG. 3. The PDP can be implemented by any policy engine such as: Keynote, XACML, etc.

Additional information regarding the scopes of the policies are discussed. One scope is Container. These container policies affect only a single container and the corresponding containers in other network devices that communicate with this container. For example, a container policy can address what type of network devices are allowed to communicate in this container, and/or the membership list for the container.

A second scope is Shared-resource. These shared-resource policies affect the usage of shared resources within a network device or node required for a container. These types of policies can be considered as a subset of policies with the scope container. For example, a shared-resource policy can address bandwidth allocation policies for each container.

A third scope is Node. These node policies affect the behavior of the network device. For example, a node policy can address the maximum number of containers that can be instantiated on a given node, such as: at most five containers can exist under specific conditions on this node.

Communications between PM instances, whether in communication domain containers 22, the Policy Container 32, or Infrastructure 24, are constrained to occur along the paths created and enforced by Infrastructure. This helps reduce the opportunity for unauthorized access to policy information.

FIG. 3 depicts the information flow for the basic functional components. In one embodiment, the basic functional components of the PM are similar to IETF policy-based management architecture, which includes the following. A Policy Decision Point (PDP) 34 evaluates the stored policies when triggered by a request (passive) or an event (proactive). The decision made is then passed to a Policy Enforcement Point (PEP) 36 which enforces policy decisions. Typically, the PEP 36 resides in the subsystem that the policy system manages. Policy Repository (PR) 38 stores the policies used in the policy system.

The feedback loop 40 allows the PDP 34 to retrieve (or be notified of) information from the managed system when evaluating policies and automating behaviors of the managed system. Although not part of the IETF-proposed architecture, the feedback loop is commonly used, particularly with obligation policies.

PM adopts the architecture described above with three additional components as follows. A Policy User Interface (PUI) allows policy authorities (administrators) to create and modify policies. In a military deployment, the PUI is enabled only on specific nodes determined by the mission. A Conflict Detection Point (CDP) detects conflicts between a newly created or modified policy against the existing set of stored policies. A Policy Distribution Interface (PDT) is used to securely distribute policies over the network.

Figure 4:
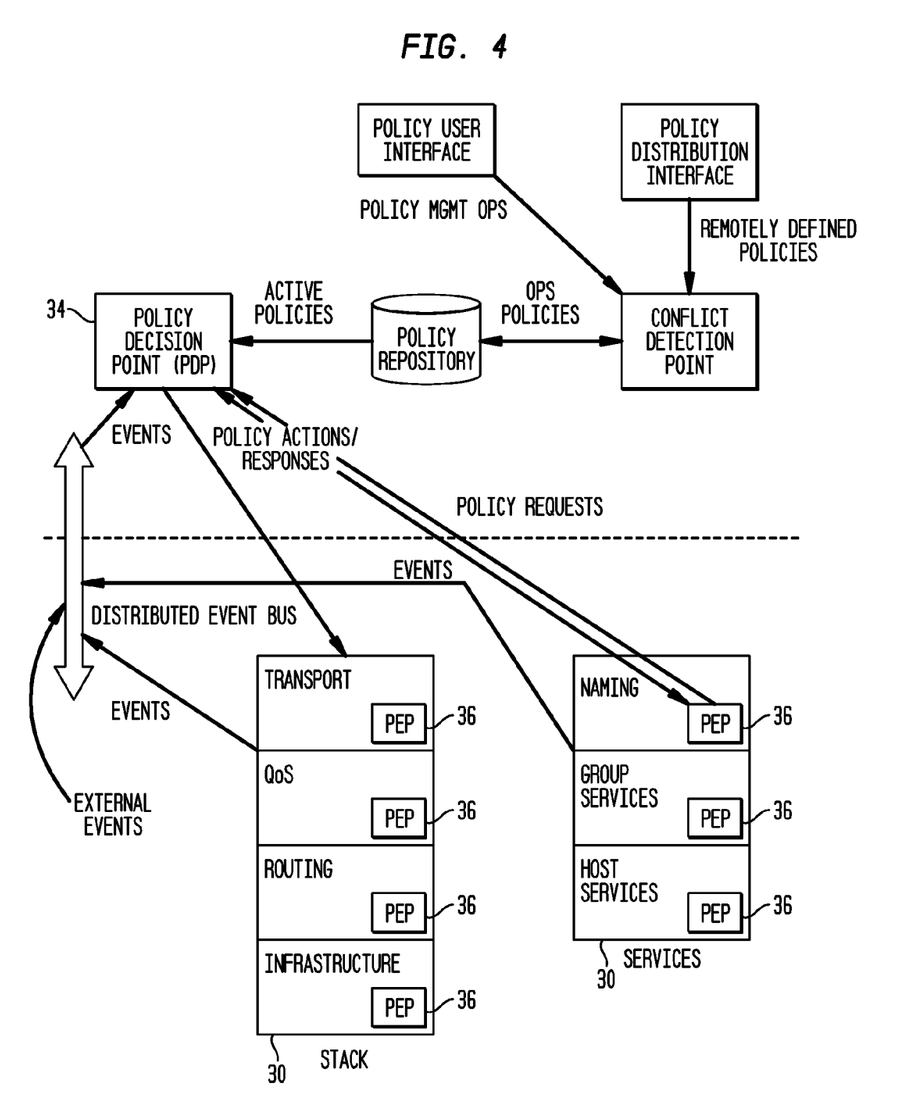
FIG. 4 shows policy management components within a container.

FIG. 4 depicts one embodiment of the inventive system in which the PM components and their relationships with another system within a container 22 are illustrated. These PM components contain the logic to control the policy-managed components. Each policy-managed component implements the PEP 36 that exports operations controllable by the PM. The PDP 34 manages the node by reacting to requests and events from other subsystems, evaluating matching policies and directly invoking PEP 36 operations.

Details of policy evaluation are described below. The requests include authorization and configuration requests. Services that started later than the PM can acquire its settings via a configuration requisition.

A limited set of events is defined to provide situation awareness for the node. The events serve as feedback information to the PDP. The usage of the events needs to be carefully designed. If one is not careful, an unstable system could result. For example, if an event causes changes to the system that will publish the same event again, the system will be trapped in an endless loop. Currently PM only recognizes events that identify the current information operations conditions (INFOCON). Obligation policies can be applied to different communication mechanisms for the DCoI based on different INFOCON level.

Usually direct invocation of the PEP operation is triggered by the PDP receiving an event or request.

Deconfliction of the PDP can also be addressed. Additional meta-information can be brought into PM for conflict detection.

All policies are stored in the Policy Repository after the Policy Deconfliction Component ensures that the policies are conflict-free. The policies can be input into PM from either the PUI or PDI.

If PM were willing to accept any policy from any source, an attacker could subvert the system by providing her own (unauthorized) policy to facilitate the attack. In order to protect policy integrity and authenticate the policy author, all policies are signed by trusted entities. Over-the-air policy updates and even policy updates by commanders and their delegates in the field can be supported.

Only valid policies issued by a trusted entity are accepted by PM. Typically the trusted entity creates policies that follow the operational intent. Some operator errors are prevented by policy conflict detection. All policies are signed directly or indirectly by a trusted entity to ensure the policy integrity and allow traceability.

In the PDP engine, an implicit condition for matching policies is the validity of the policy signature. The validity of both the signature and the signer's privilege is verified since trusted entities may change over time, for example due to change of roles for adversary action, e.g., node capture, etc. The former check relies on the existing encoding algorithms, and the latter check is implemented using a certificate revocation list. In one embodiment, the cryptographic and keys can be pre-deployed. The signature verification can be implemented by existing encoding/signing algorithms. The change of validity can be implemented, for example, using certificate revocation list [RFC 5280].

For a system with a significant number of policies, verifying the policy signature for each policy upon each request may not be efficient. The policy evaluation performance may be optimized by removing policies with invalid signatures before storing the policy or upon revoking a certificate.

After initial network deployment, administrators may need to create a new policy or modify an existing one A modified policy set then needs to be distributed to all nodes belonging to the same communication domain. Since MANET connectivity can be unstable, the distribution mechanism should be able to handle intermittent connections. When a node is temporarily out of reach, that node should obtain the modified policy set when connectivity is resumed. Accordingly, each node must know that a new policy set is required, and that nodes that do not enforce the new policy set are prevented from participating in the communication domain. Since PM manages the node based on the content of the policies, the policy set for a communication domain needs to be consistently duplicated among all communication domain members.

During the lifetime of a communication domain, policy updates can be distributed via multicast to all members with simple synchronization mechanisms for tolerating unstable network connectivity. In one embodiment, the system can re-key when policy distribution occurs. In order to get the new key, a node must have a copy of the current policy set.

Keynote can be used in one embodiment as a base for the PDP implementation. It offers an evaluation environment where the default state is denial and policies specify the authorizations and actions allowed in the system. In the inventive system, Keynote can be extended to allow specification of obligation policies so that based on occurrence of particular events, policy evaluation returns corresponding multi-dimensional vectors containing specifications for configuration parameter changes or actions that need to be executed by PEPs.

A potential security concern is using the negate operation (for example, the 'not equal' operation '!=' in Keynote) in the policy condition statement. This is because PM policies are permissive policies, that is, policies specify only what the outcome should be, or what operations are permitted. Unexpected outcomes and declined operations are simply not mentioned in the policies. The condition in the policy of Listing (below) illustrates this concern. Specifically, the condition for track is changed to "not purple." In a system with only "blue" and "purple" tracks, the change makes no difference. However, when a new track, for example "red", is introduced to the system, the policy implicitly permits both the "red" and "blue" tracks to join the DCoI, which is potentially undesirable for a high security environment.

Listing: Example of Negate Condition

```
...                                                              1
Conditions: (DCOI == "Chat") &&
    (group == "A" || group == "B" || group == "C") &&            3
    (track != "purple") &&
    (request == "join") -> "true;                                5
...
```

Though the Keynote implementation of verify negative conditions is disabled, from a usability perspective, there can be some assistance in the user interface to expand the condition when editing a policy.

In the embodiment discussed above, the system by default denies all operations. But some operations, e.g. bootstrap, needs to be permit by default and denied afterwards. These specific operations are not part of the general policy system. During the bootstrap process for a container, PM starts with an initial set of policies if this node is the policy administrator of the communication domain.

Integrity includes the integrity of policies themselves and also the integrity of PDP decisions. All nodes are identified by their node creators or modifiers. During policy evaluation, a PDP only considers authenticated policies. PM utilizes a certificate revocation list to maintain the authorized set of policy signers. Policies that are deployed without a proper signature can be revoked from the repository.

Confidentiality indicates that specific information is known only by the information provider and its intended receiver. Besides network encryption for policy distribution, each DCoI container can have its own PBMS instance to process policy information.

In a MANET, network communication is not as reliable as in wired networks. Policies need to be made available to all nodes in a DCoI, so appropriate reliable protocols (unicast or multicast) are used. Though PM denies all operations by default, bootstrap processes are permitted to ensure the ability to setup initial communication between nodes.

It is likely that the solutions that fit the security-related requirements of PM can be applied to other network environments, e.g., wireline networks. Advantageously, this reduces the ability of attackers to attack the policy system. By attacking policy on one node, the attacker does not directly affect other nodes. By attacking policy for one application, the attacker does not affect policy for other applications. The attacker cannot look at policies for unrelated applications which prevents him from inferring information about users' future actions or missions. Authentication and validation of polices means that the system will not enforce corrupted policies.

As will be appreciated by one skilled in the art, the present invention may be embodied as a system, method or computer program product. Accordingly, the present invention may take the foam of an entirely hardware embodiment, an entirely software embodiment (including firmware, resident software, micro-code, etc.) or an embodiment combining software and hardware aspects that may all generally be referred to herein as a "circuit," "module" or "system."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A system for policy based management, comprising:
   one or more policy managers, each operable on a processor and performing policy decision-making and policy enforcement using one or more policies;
   one or more containers, each container related to an application and each container having one policy manager of the one or more policy managers;
   one or more nodes, each node having an infrastructure comprising at least a processor, and at least one container of the one or more containers, the one or more nodes operable on a secure mobile ad-hoc network (MANET); and
   communication domains associating the one or more containers having a same application, the containers being in different nodes, the associated containers maintained by the communication domains on the secure MANET;
   each said policy manager comprising:
   a policy decision point evaluating stored policies when triggered by a request or an event;
   a policy enforcement point receiving a decision from the policy decision point and enforcing the decision;
   a policy repository storing the policies used in the policy system;
   said policy decision point retrieving via a feedback loop information from the managed system when evaluating policies and automating behavior of the managed system;
   a policy user interface allowing policy authorities to create and modify policies;
   a conflict detection point detecting conflicts between a newly created or modified policy and an existing set of stored policies; and
   a policy distribution interface to securely distribute polies over a network.

2. The system of claim 1, wherein each container defines a security boundary within the node for the container.

3. The system of claim 1, wherein each container is a lightweight virtual machine.

4. The system of claim 1, further comprising a special container having a policy manager only evaluating policies for conflicts.

5. The system of claim 1, wherein each policy is signed by a trusted entity.

6. The system of claim 1, wherein some policies of the one or more policies are container policies, each container policy affecting only one container and a communication domain corresponding to the one container.

7. The system of claim 1, wherein some policies of the one or more policies are shared-resource policies, each shared-resource policy affecting usage of shared resources in one container and the node for the one container.

8. The system of claim 1, wherein some policies of the one or more policies are node policies, each node policy affecting behavior of a network device.

9. The system for policy based management as set forth in claim 1, said policy user interface enabled only on specific nodes.

10. The system for policy based management as set forth in claim 1, further comprising a policy repository storing policies after the conflict detection point ensures the policies are conflict free.

11. The system for policy based management as set forth in claim 1, where only policies issued from a trusted entity are accepted by a policy manager.

12. The system for policy based management as set forth in claim 1, further comprising removing policies with invalid signatures before storing the policy.

13. A method for policy based management, comprising:
   performing, on one or more containers, policy decision-making and policy enforcement using one or more policies, said policy decision-making and policy enforcement performed using a policy manager residing in each of the one or more containers;

recognizing one or more nodes, each node having at least one container of the one or more containers, the one or more nodes operable on a secure mobile ad-hoc network (MANET);

associating the one or more containers having a same application; and maintaining the associated containers on the secure MANET;

each said policy manager comprising:

evaluating stored policies when triggered by a request or an event;

receiving a decision evaluating and enforcing the decision;

storing, in a policy repository, the policies used in the policy system;

retrieving via a feedback loop information from the managed system when evaluating policies and automating behavior of the managed system;

allowing policy authorities to create and modify policies;

detecting conflicts between a newly created or modified policy and an existing set of stored policies; and a policy distribution interface to securely distribute polies over a network.

14. The method of claim 13, wherein each container defines a security boundary within a node.

15. The method of claim 13, wherein each container is a lightweight virtual machine.

16. The method of claim 13, further comprising a special container having a policy manager only evaluating policies for conflicts.

17. The method of claim 13, further comprising a step of signing each policy by a trusted entity.

18. The method of claim 13, wherein some policies of the one or more policies are container policies, each container policy affecting only one container and a communication domain that associated with the one container.

19. The method of claim 13, wherein some policies of the one or more policies are shared-resource policies, each shared-resource policy affecting usage of shared resources in one container and a node for the one container.

20. The method of claim 13, wherein some policies of the one or more policies are node policies, each node policy affecting behavior of a network device.

21. The method for policy based management as set forth in claim 13, further comprising storing policies after the conflict detection point ensures the policies are conflict free.

22. The method for policy based management as set forth in claim 13, where only policies issued from a trusted entity are accepted by a policy manager.

23. The method for policy based management as set forth in claim 13, further comprising removing policies with invalid signatures before storing the policy.

24. A program storage device storing a program of instructions executable by a machine to perform a method of policy based management, comprising:

performing, on one or more containers, policy decision-making and policy enforcement for one or more policies, said policy decision-making and policy enforcement performed using a policy manager residing in each of the one or more containers;

recognizing one or more nodes, each node having at least one container of the one or more containers, the one or more nodes operable on a secure mobile ad-hoc network (MANET);

associating the one or more containers having a same application; and maintaining the associated containers on the secure MANET;

each said policy manager comprising:

evaluating stored policies when triggered by a request or an event;

receiving a decision evaluating and enforcing the decision;

storing, in a policy repository, the policies used in the policy system;

retrieving via a feedback loop information from the managed system when evaluating policies and automating behavior of the managed system;

allowing policy authorities to create and modify policies;

detecting conflicts between a newly created or modified policy and an existing set of stored policies; and a policy distribution interface to securely distribute polies over a network.

25. The program storage device of claim 24, wherein each container defines a security boundary around the node.

26. The program storage device of claim 24, wherein each container is a lightweight virtual machine.

27. The program storage device of claim 24, wherein one of the one or more containers is a special container having a policy manager only evaluating policies for conflicts.

28. The program storage device of claim 24, wherein each policy is signed by a trusted entity.

29. The program storage device of claim 24, wherein some policies of the one or more policies are container policies, each container policy affecting only one container and a communication domain associated with the one container.

30. The program storage device of claim 24, wherein some policies of the one or more policies are shared-resource policies, each shared-resource policy affecting usage of shared resources in one container and a node for the one container.

31. The program storage device of claim 24, wherein some policies of the one or more policies are node policies, each node policy affecting behavior of a network device.

32. The program storage device of claim 24, further comprising storing policies after the conflict detection point ensures the policies are conflict free.

33. The program storage device of claim 24, where only policies issued from a trusted entity are accepted by a policy manager.

34. The program storage device of claim 24, further comprising removing policies with invalid signatures before storing the policy.

* * * * *

UNITED STATES PATENT AND TRADEMARK OFFICE
CERTIFICATE OF CORRECTION

| | | |
|---|---|---|
| PATENT NO. | : 8,769,068 B2 | |
| APPLICATION NO. | : 12/711638 | |
| DATED | : July 1, 2014 | |
| INVENTOR(S) | : Alexander et al. | |

It is certified that error appears in the above-identified patent and that said Letters Patent is hereby corrected as shown below:

In the Specification

In Column 4, Line 25, delete "faun." and insert -- form. --, therefor.

In Column 6, Line 23, delete "(PDT)" and insert -- (PDI) --, therefor.

In Column 7, Line 23, delete "one" and insert -- one. --, therefor.

In Column 8, Line 55, delete "foam" and insert -- form --, therefor.

In the Claims

In Column 10, Line 25, in Claim 1, delete "polies" and insert -- policies --, therefor.

In Column 11, Line 21, in Claim 13, delete "polies" and insert -- policies --, therefor.

In Column 12, Line 25, in Claim 24, delete "polies" and insert -- policies --, therefor.

Signed and Sealed this
Fourteenth Day of October, 2014

Michelle K. Lee
*Deputy Director of the United States Patent and Trademark Office*